W. E. McLAREN.
CONVERTIBLE VEHICLE.
APPLICATION FILED JUNE 5, 1919.
1,370,604.
Patented Mar. 8, 1921.
2 SHEETS—SHEET 2.
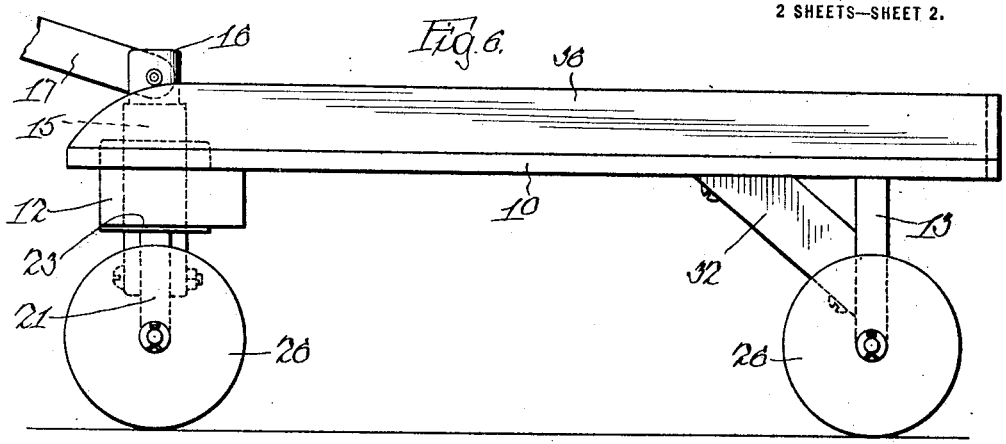
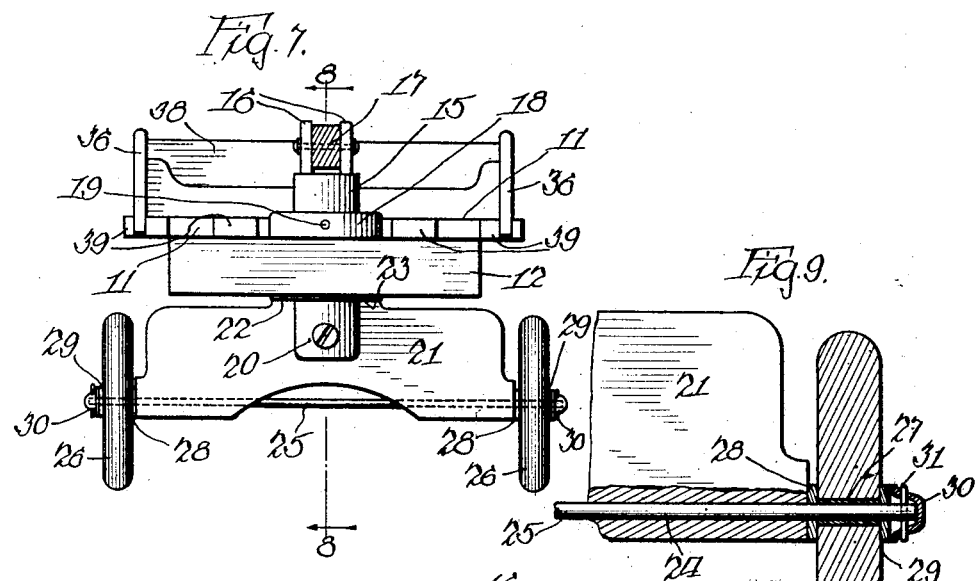
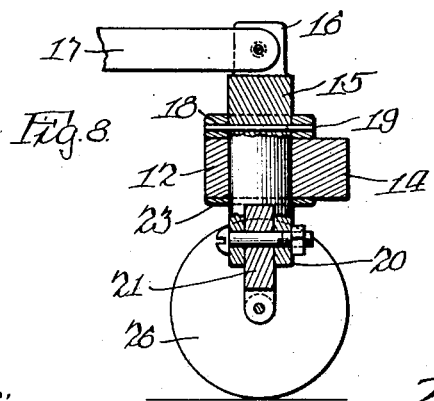
Witness:
Leo J. Dubrais
Inventor.
William E. McLaren
By Chas. C. Tillman
Atty.

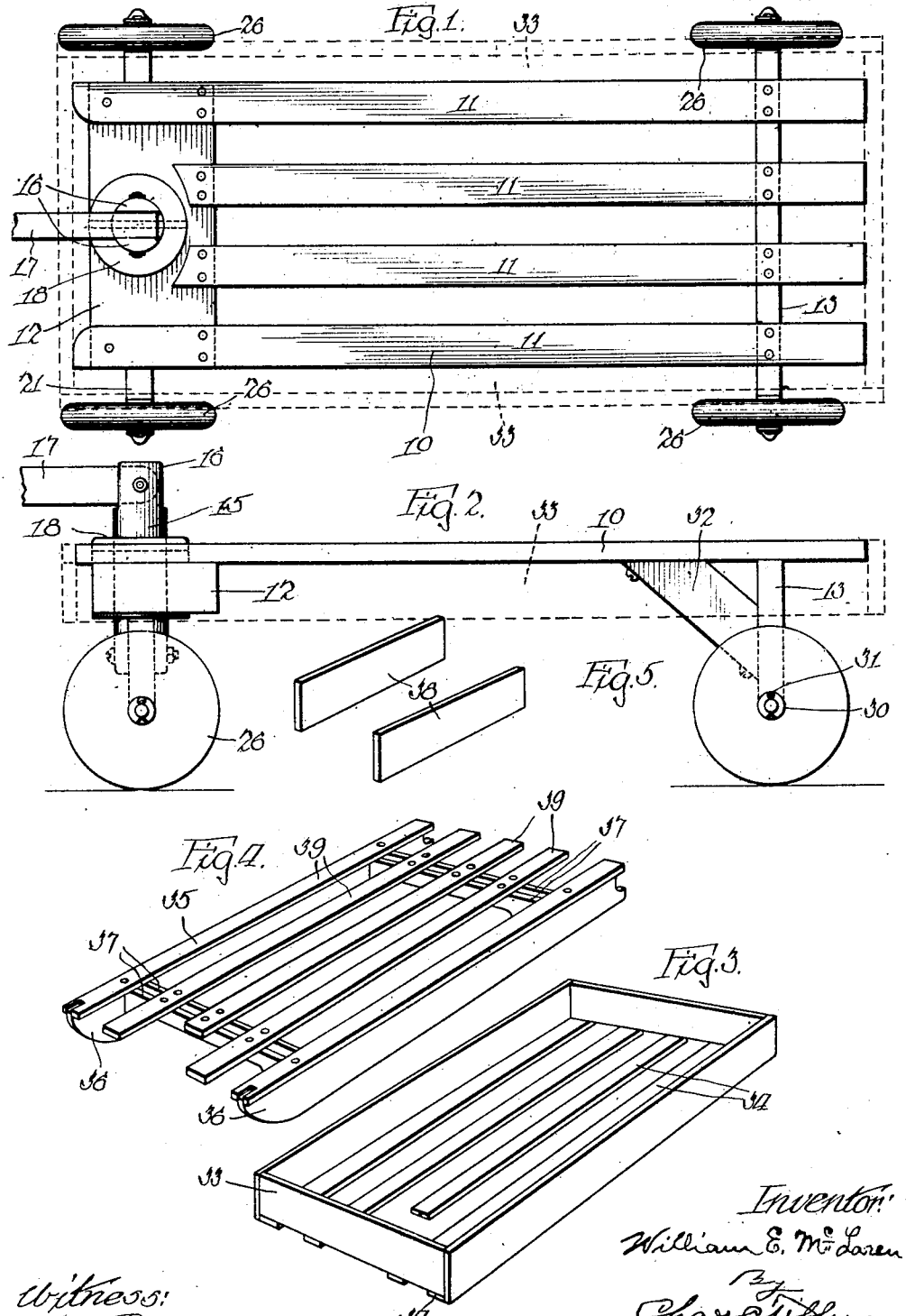

UNITED STATES PATENT OFFICE.

WILLIAM E. McLAREN, OF CHICAGO, ILLINOIS, ASSIGNOR, BY MESNE ASSIGNMENTS, TO McLAREN-SLEIGHT CORPORATION, OF CHICAGO, ILLINOIS, A CORPORATION OF MICHIGAN.

CONVERTIBLE VEHICLE.

1,370,604.  Specification of Letters Patent.  Patented Mar. 8, 1921.

Application filed June 5, 1919. Serial No. 301,964.

*To all whom it may concern:*

Be it known that I, WILLIAM E. MCLAREN, a citizen of the United States, residing at Chicago, in the county of Cook and State of Illinois, have invented certain new and useful Improvements in Convertible Vehicles, of which the following is a specification.

This invention relates to improvements in vehicles for practical use, particularly by children, and it consists in certain novel features and peculiarities of the construction, arrangement, combination and operation of the various parts thereof, as will be hereinafter more fully set forth and specifically claimed.

The principal object of the invention is to provide a convertible vehicle adapted to be used for a plurality of purposes, for instance, as what is commonly called an "express" wagon for children, to be used for hauling purposes, as a box-less or body-less wagon for the occupancy or use of one or more persons or children for riding, as a coaster or coasting wagon and as a sled, which shall be simple and inexpensive in construction, strong, durable, and efficient in operation, and which can be readily and quickly changed from one of said types or forms of vehicle to another by interchangeable placement of parts, but without the necessity of removing screws, nails and the like, or in using them for securing the removable parts in position.

Various other objects and advantages of the invention will be disclosed in the following description and explanation.

In the accompanying drawings which serve to illustrate an embodiment of the invention, Figure 1 is a plan view of one form of the vehicle, showing by the dotted lines, a box or body mounted on the supporting frame of the vehicle, thus forming an express wagon.

Fig. 2 is a view in side elevation showing the box or body by dotted lines in its inverted position and mounted on the supporting frame of the vehicle, thus forming a coaster or coasting vehicle.

Fig. 3 is a detached perspective view of the box or body.

Fig. 4 is a similar view of the removable sled member of the vehicle.

Fig. 5 is a detached perspective view of the removable cross-pieces of the sled member.

Fig. 6 is a view in side elevation showing the sled member mounted in its operative position on the supporting frame or platform of the vehicle to form a box or body therefor, thus converting the vehicle into an express or hauling wagon.

Fig. 7 is a view in front elevation of Fig. 6.

Fig. 8 is an enlarged sectional view partly in elevation taken on line 8—8 of Fig. 7, looking in the direction indicated by the arrows, and Fig. 9 is an enlarged view partly in section and partly in elevation of a part of one of the bolsters of the vehicle, showing the construction of the means for supporting the axle and the means for mounting the wheels thereon.

Like numerals of reference, refer to corresponding parts throughout the different views of the drawings.

Referring now to Figs. 1, 2, and 6 of the drawings, the numeral 10 designates, as a whole, the supporting frame or platform of the vehicle, which as shown, consists of a plurality of spaced apart and longitudinally extended flat bars or strips 11, preferably of wood. These bars or strips are supported near their front and rear ends on the upper surface of bolsters 12 and 13, which extend transversely with respect to the slats or bars 11, which latter may be secured to said bolsters by screws or otherwise. The bolster 12, at the front portion of the platform or frame 10, is considerably wider than the bolster 13, and is provided at its middle with a vertical opening 14 for the reception and operation of a steering post 15, which has its upper end bifurcated or provided with prongs 16, between which is pivotally mounted one end of a tongue or handle 17, which may be of any suitable length and construction, and is used in conjunction with the steering post 15, for propelling and steering the vehicle.

As is clearly shown in Figs. 1, 2, 6, and 8 of the drawings, the steering post 15 has mounted thereon above the bolster 12, a collar 18, which is fixed to said post by means of a pin 19, extended through suitable openings in said collar and post. This collar rests on the upper surface of the bolster 12, and provides a bearing support for the steering post as is obvious.

By referring to the above mentioned figures of the drawings, it will also be observed that the lower end of the steering post 15 is also bifurcated or provided with prongs 20, between which is located and rigidly secured a cross-piece or axle and bolster support 21, which is substantially of the same length as the width of the supporting frame 10 of the vehicle. The member 21 is provided at its central upper portion with an upward extension 22, see Fig. 7, which projects on each side of the steering post 15, or forks 20 thereof, and provides a bearing support for the washer 23, which surrounds the post 15, and which is interposed between the bolster 12 and the member 21, as shown in different views of the drawings. The lower portion of the member 21 is provided with a longitudinally extended opening 24 for the reception of the axle 25, which extends beyond the ends of the member or axle and bolster support 21, and has mounted on each of said extensions a wheel 26 of any suitable size and material, but by preference of wood. Each of the wheels 26 is provided centrally with a sleeve or bushing 27, which fits snugly around the axle.

Interposed between each of the wheels 26 and the member 21 and surrounding the axle, is a washer or disk 28, and located externally of each of the wheels and surrounding the axle is another disk or washer 29, which latter washers are held in place by means of caps 30, one of which is fitted over each end of the axle and secured thereon by means of a cotter pin 31, extended through suitable openings in the cap and axle.

The rear bolster 13, is of substantially the same dimensions in depth as the combined depth of the bolster 12 and member 21, and is secured directly and rigidly to the lower surface of the frame or platform 10 near its rear end. The bolster 13 is by preference also connected to the platform 10 by means of forwardly extended braces 32 and is equipped at its lower portion with a wheeled axle of the same construction and arrangement as that of the front axle just above described. The rear wheels 26 being mounted on their axle in a similar manner to that above explained.

As far as above described, a complete but box-less or body-less vehicle is provided, which can be used by children for riding and coasting purposes, and which can be drawn or steered by means of the handle or tongue 17 in the well-known way.

By referring to Fig. 1, it will be seen that the intermediate slats or bars 11 terminate at their front ends, short of the collar 18, and that said ends of said straps are secured to the upper surface of the bolster 12, which arrangement will prevent any interference with steering the vehicle.

In order to convert the vehicle from the form just described into a type or form for carrying or hauling articles, I employ a rectangular box or body 33, which has its upper part open and its lower part partially closed by means of longitudinally extended and spaced apart slats 34, which, when the box 33 is placed in the position indicated by dotted lines as shown in Fig. 1 of the drawings, will fit snugly in the spaces between the slats 11 of the platform 10, thus forming a flat closed bottom for the box.

By reference to the last named view of the drawings, it will be understood that the intermediate slats 34 of the box 33, will occupy the spaces between the slats or bars 11, of the frame 10, but that the outer or side straps 34 of the box will be located outwardly of the side straps or bars 11 of the frame, and that the walls of the box will extend upwardly from the frame and be located a slight distance outwardly therefrom, as the box is somewhat larger than the frame as shown.

In order to provide the vehicle with a flat closed top or platform, it is only necessary to invert the box 33, so that its walls will depend from the frame 10, as is clearly shown by dotted lines in Fig. 2 of the drawings.

By this arrangement it will be understood that the slats 34 of the box will occupy the same position with respect to the slats 11, of the frame 10, as in the last above described construction.

Another, and it may be said, a favorite way of procuring an express wagon or a wagon having a box or container, is accomplished by the use of a sled-box which is designed as a whole by the reference numeral 35, see Fig. 4, and which consists of a pair of parallel runners or side-pieces 36, which are joined together transversely near their front and rear ends by means of a pair of parallel and spaced apart cross-pieces 37, which are for the purpose of firmly securing the runners or side-pieces 36 together as well as for receiving and retaining, each, a removable board 38, which is employed when the sled-box is used in conjunction with the frame 10 of the vehicle for closing said box near its ends. Located and secured on the upper surface of the cross-pieces 37, are a series of spaced apart slats 39, which are so spaced as to receive therebetween the slats 11, of the frame 10, when the sled-box is placed in an inverted position from that shown in Fig. 4 of the drawings, in which it will be understood that a box or body provided with a closed bottom by means of the slats 11 of the frame 10, and the slats 39 of the sled-box will be furnished.

It will be noticed by reference to Fig. 4 that the middle slat 39 of the sled-box terminates at its front end, short of the corresponding ends of the other slats of said box, so that when the box is placed in the position shown in Fig. 6 on the frame 10, the steering post 15 will not be interfered with by said middle slat.

It is obvious that when it is desired, the sled-box can be removed from the frame 10, the boards 38 detached from the holders 37 therefor, and the box located in the position shown in Fig. 4 of the drawings when it can be used as a sled.

From the foregoing and by reference to the drawings, it will be readily understood and clearly seen, that by my improvements, I have provided a convertible vehicle of great utility in affording a practical vehicle for riding purposes as well as for carrying articles of various kinds, and also for furnishing amusement, healthful exercises and sport to children.

Having thus fully described my invention what I claim as new and desire to secure by Letters Patent, is—

1. In a device of the character described, the combination with an elongated rectangular wheeled frame having horizontally and longitudinally disposed spaced apart slats, of a removable box or body having longitudinally disposed slats spaced to receive therebetween the slats of said frame, the slats of the frame and the slats of the body being of proper width and thickness and so placed as to fit snugly in the spaces between the slats of each when the body is placed in position on the frame, thereby providing a closed smooth surfaced platform, and means at one end of the frame to steer the same.

2. In a device of the character described, the combination with a wheeled frame having longitudinally disposed and spaced apart slats, of a removable box or body having longitudinally disposed slats spaced to receive therebetween the slats of the frame, the slats of the frame and the slats of the box being of proper width to fit snugly in the spaces between the slats of each, and adjustable means on the front portion of the frame to steer the same.

3. In a device of the character described, the combination with a wheeled frame having longitudinally disposed and spaced apart slats, the intermediate slats of said frame terminating at one of their ends short of the end of the frame, of a steering post vertically journaled in the frame near the shortened ends of said slats, a removable box or body having longitudinally disposed slats spaced to receive therebetween the slats of the frame, and a handle pivotally connected to the upper portion of said steering post.

4. In a convertible vehicle, the combination with a pair of wheeled bolsters, the wheels of one of said bolsters being mounted for independent movement with respect thereto, of a frame consisting of spaced apart slats secured transversely with respect to said bolsters and on the same, one of said bolsters having a vertical opening in its middle portion, a steering post located in said opening and connected to the wheels supporting said bolster, a removable box having longitudinally disposed slats spaced to receive therebetween the slats of said frame, and means adjustably connected to the steering post for steering the vehicle.

5. In a device of the character described, the combination with a wheeled frame having longitudinally disposed and spaced apart slats, at least one of the intermediate slats of said frame terminating at one of its ends, short of the frame, a steering post vertically journaled in the frame near the shortened end of said slat and connected to the wheels supporting the front end of the frame, a removable box or body having longitudinally disposed slats spaced to receive therebetween slats of the frame, at least one of the intermediate slats of said box terminating at one of its ends short of the frame, and a handle pivotally connected to the upper portion of said steering post.

6. A device of the class described, consisting of a wheeled frame having longitudinally disposed and spaced apart slats, a removable box or body having longitudinally disposed slats spaced to receive therebetween the slats of the frame, the slats of the frame and the slats of the box being of proper widths to fit snugly in the spaces between the slats of each, the side walls of the box having one of their ends rounded, a transversely disposed holder uniting the side walls of the box near each of their ends and a removable board located in each of said holders.

7. In a wheeled vehicle the combination with a supporting frame, of a bolster transversely mounted thereon near one of its ends, said frame and bolster having a vertical opening therein, a steering post located in said openings, an axle supporting member mounted on the lower portion of the steering post having on its central portion an upward extension, a washer located between said extension and the bolster surrounding the steering post, a wheeled axle carried by said member, a collar surrounding the steering post above the supporting frame, and a handle adjustably secured to the upper portion of the steering post.

8. In a device of the character described, the combination with a wheeled frame having longitudinally disposed and spaced slats, of a removable and invertible box or body having longitudinally disposed slats spaced to receive therebetween the slats of the frame, the slats of the frame and the slats of the body being of proper width and so spaced as to fit snugly in the spaces between the slats of each when the body is placed in either position, and adjustable means on the front portion of the frame to steer the same.

In testimony whereof I hereunto set my hand on this 28th day of May, A. D. 1919.

WILLIAM E. McLAREN.